Jan. 12, 1960     R. W. LA MARCHE     2,921,254
CELL OR BATTERY TESTING DEVICE
Filed Feb. 15, 1956
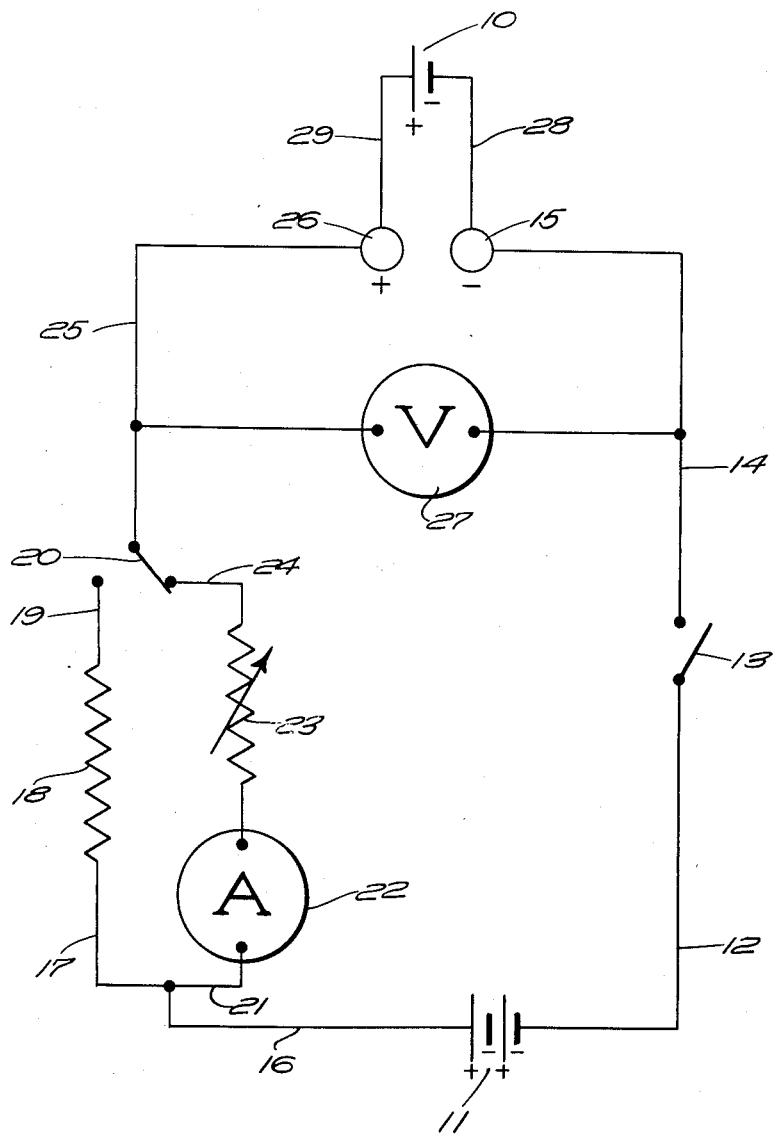
INVENTOR.
ROBY W. LAMARCHE
BY
ATTORNEY United States Patent Office 2,921,254
Patented Jan. 12, 1960

2,921,254
CELL OR BATTERY TESTING DEVICE
Roby W. La Marche, Wakefield, R.I.
Application February 15, 1956, Serial No. 565,595
9 Claims. (Cl. 324—29.5)

My present invention relates to battery testing devices and more particularly to a device for testing the percentage of charge in a cell or battery.

The principal object of the present invention is to provide a testing device for a battery having high amperage output and extremely low internal resistance.

A further object of the present invention is to provide a tester particularly adaptable for a nickel-cadmium battery having sintered plates.

Another object of the present invention is to provide a battery or cell testing device which will test the percentage of charge left in a battery where the characteristics of the battery make it impossible to use conventional testing devices.

A further object of the present invention is to provide a device of the character described which is simple in construction and easy and economical to manufacture and assemble.

Another object of the present invention is to provide a novel method of testing the percentage-of-charge in particular types of batteries.

With the above and other objects and advantageous features in view my invention consists of a novel method and a novel assembly of parts, more fully disclosed in the detailed description following in conjunction with the accompanying drawing and more particularly defined in the appended claims.

The single figure is a diagram of the electrical circuit for the tester of the present invention.

In recent years many new developments have been made in storage batteries to provide a battery having a very low internal resistance and a high amperage so that it will deliver a virtually constant voltage regardless of the percentage-of-charge left in the battery. For example, a nickel-cadmium battery having sintered plates is used with potassium hydroxide as the electrolyte. Such a battery is used in jet planes and guided missiles. The battery has an extremely long life and will deliver a virtually constant voltage at high amperage. The internal resistance of this battery approaches zero. As a result conventional testing equipment will not work, and there are no means of determining the percentage-of-charge left in the battery. The basic principle of the present invention is based on the fact that a battery or cell voltage will rise with the application of a charging current to a certain point which is determined by the amount of charging current and the state of charge of the battery. This involves two variables. In the tester of the present invention means are provided for making the charging current a fixed quantity. With the charging current, or one variable, fixed, the voltage across the cell being tested will vary directly according to the state of charge of the cell. Using this principle, a voltmeter can be calibrated so that the percentage-of-charge in the cell or battery being tested can be read directly from the voltmeter.

Because it takes some time for the cell being tested to reach the "on charge" voltage, I provide means for furnishing a comparatively high current for a short time to bring the cell or battery being tested quickly up to a point where the fixed charging current may be applied and a reading made. To obtain readings, the charging voltage should be greater than that of the cell or battery being tested but not great enough to set up a charging action in the tested cell or battery.

In the drawings, it is assumed that the cell or battery 10 being tested has a full charge reading of 1.5 volts nominal. I therefore provide two 1.5 volt dry cells 11 connected in series to furnish 3 volts. The tester is provided with a cord lead connection 12 extending from the negative pole of the battery 11 and leading to a single pole on and off switch 13 for opening the circuit when the tester is not in use. A cord lead connection 14 extends from the switch 13 to a negative binding post or jack opening 15.

The positive pole of the battery 11 is provided with a cord lead connection 16 which splits into two leads. The lead 17 leads to a resistor 18, with the other side of the resistor connecting at 19 to a double throw switch 20. The second lead 21 connects to an ammeter 22. The other side of the ammeter is connected in series with a variable resistor 23 which is also connected at 24 to the double throw switch 20. The switch 20 is a single pole double throw switch in which the leads 19 and 24 are contacted in turn by the single pole. It is preferred that the switch be of a spring-return type normally connected with the lead 24 as illustrated. The single pole of the switch 20 is connected by a lead 25 to the positive binding post or jack 26. A voltmeter 27 is connected across the leads 14 and 25. It should be noted that the resistor 18 is of much lower resistance than the variable resistor 23.

In operation the tester is connected to the cell or battery 10, the lead wire 28 connecting the negative post 15 with the negative side of the battery or cell and the lead wire 29 connecting the positive post 26 with the positive side of the battery or cell. The voltmeter 27 will now give a reading on the cell or battery 10. However, this reading will be low in voltage and of no value since open-circuited batteries or cells tend to stabilize out to certain low voltage values regardless of the state of the charge, with the voltage varying according to the type of construction of the battery or cell. The switch 13 is then closed connecting the battery or cell 10 with the charging source 11. Current will flow through the lead 12, switch 13, lead 14, lead 28, through the cell or battery 10, lead 29, lead 25, switch 20, lead 24, resistor 23, ammeter 22, and leads 21 and 16 back to the source of charge 11. Since it would normally take some time for the cell to reach its "on charge" voltage with the above current, the spring-switch 20 is manually operated to throw the pole across to the lead 19 causing a comparatively high current to flow through the low resistor 18 and shutting off the flow through the variable resistor 23 and the ammeter 22.

While the switch is manually held in this position, a gradually increasing reading will be noted on the voltmeter 27. When the needle of the voltmeter slows its movement or stops completely, the switch 20 is released to return to the position shown in the drawing and allowing the current to flow through the variable resistor 23 and ammeter 22. The resistor 23 is preadjusted so that the current flow is held to a fixed amount. The voltmeter 27 is calibrated to give a correct reading for the cell under test in relation to the preadjusted flow of current through the resistor 23. When the needle of the voltmeter 27 ceases to move, either up or down, a direct reading can be taken. If the voltmeter is not calibrated in percentage-of-charge readings, the condition of the cell may be determined by the use of a chart in which voltage readings are converted to percentage-of-charge readings.

The ammeter 22 may be arranged with a variety of shunts operated by a rotating switch so that any amount of charging current can be handled and indicated so that cells or batteries of any capacity may be checked. For the purposes of illustration the charging current source is indicated by two dry cells which have a limited life and current capacity. These can be replaced by wet cells and an automatic A.C. charger, or an A.C. rectifier operated directly from 115 volts A.C., to provide indefinite life and current capacity.

The tester of the present invention can be designed with small changes of components, to be used for single cells, series of cells, batteries, or series of batteries. Other advantages of the present invention will be readily apparent to a person skilled in the art.

I claim:

1. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means in series with said positive pole cord lead for predetermining and fixing said current, and a voltmeter connected across said positive and negative cord lead connections.

2. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means including a variable resistor in series with said positive pole cord lead for predetermining and fixing said current, and a voltmeter connected across said positive and negative cord lead connections.

3. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means including a variable resistor and an ammeter in series with said positive pole cord lead for predetermining and fixing said current, and a voltmeter connected across said positive and negative cord lead connections.

4. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means in series with said positive pole cord lead for predetermining and fixing said current, means for by-passing said current predetermining and fixing means, and a voltmeter connected across said positive and negative cord lead connections.

5. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means including a variable resistor in series with said positive pole cord lead for predetermining and fixing said current, means for by-passing said current predetermined and fixing means, and a voltmeter connected across said positive and negative cord lead connections.

6. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means including a variable resistor and an ammeter in series with said positive pole cord lead for predetermining and fixing said current, means for by-passing said current predetermining and fixing means, and a voltmeter connected across said positive and negative cord lead connections.

7. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means in series with said positive pole cord lead for predetermining and fixing said current, means for by-passing said current predetermining and fixing means, and a voltmeter connected across said positive and negative cord lead connections, said by-passing means comprising a resistor of low resistance and a switch for shunting the current through said low resistance resistor instead of said current predetermining and fixing means.

8. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means including a variable resistor in series with said positive pole cord lead for predetermining and fixing said current, means for by-passing said current predetermining and fixing means, and a voltmeter connected across said positive and negative cord lead connections, said by-passing means comprising a resistor of low resistance and a switch for shunting the current through said low resistance resistor instead of said current predetermining and fixing means.

9. A device for determining the percentage of charge in a nickel cadmium cell or battery with potassium hydroxide electrolyte comprising a source of charging current having a charging voltage greater than the cell or battery but less than the voltage necessary to set up a charging action in the cell or battery, cord lead connections from the negative pole of said charging source to the negative pole of the cell or battery and from the positive pole of said charging source to the positive pole of said cell or battery, means including a variable resistor and an ammeter in series with said positive pole cord lead for predetermining and fixing said current, means for by-passing said current predetermining and fixing means, and a voltmeter connected across said positive and negative cord lead connections, said by-passing means comprising a resistor of low resistance and a switch for shunting the current through said low resistance resistor instead of said current predetermining and fixing means.

References Cited in the file of this patent

UNITED STATES PATENTS

| | | |
|---|---|---|
| 2,229,009 | Berry | Jan. 14, 1941 |
| 2,632,793 | Linn | Mar. 24, 1953 |
| 2,782,357 | Heyer | Feb. 19, 1957 |
| 2,864,055 | Kordesch et al. | Dec. 9, 1958 |